Patented Feb. 2, 1954

2,668,145

UNITED STATES PATENT OFFICE 2,668,145

LUBRICATING COMPOSITIONS

Geza S. Ronay, Oakland, Calif., assignor to Shell Development Company, Emeryville, Calif., a corporation of Delaware No Drawing. Application August 4, 1951, Serial No. 240,457

19 Claims. (Cl. 252—32.5)

This invention relates to improved liquid lubricating compositions. More particularly this invention relates to improved liquid lubricating compositions comprising liquid petroleum oil fractions and a minor proportion of a modified clay of oleophilic character to improve the viscosity and viscosity index and to lower the pour point of the oil.

It is well known that some of the desired properties of base lubricating oils such as motor oils, gear oil, hydraulic oils, torque convertor oils are oxidation resistant, non-corrosivity, high viscosity index and low pour point. Among the compounds heretofore used as viscosity index improvers and pour point depressants are soaps; polymeric materials such as polybutene, polymethacrylates, alkylated polystyrene, rubber; and halogenated hydrocarbons such as chlorinated waxes, chlorinated alkylaryl hydrocarbons and the like. Although these additives function as viscosity index improvers and pour point depressants, they are limited in their use because of one or more shortcomings: instability at elevated temperatures; increase or decrease in viscosity due to polymerization or degradation of these viscosity index improvers under high mechanical shear; corrosivity; or incompatability with some types and fractions of base oils.

It has now been found that liquid lubricants of improved viscosity index and pour point depressant properties are provided by incorporating in liquid base oleaginous lubricating media less than 0.5% by weight, and preferably from 0.01 to 0.2%, of a modified water-resistant oleophilic clay, hereinafter termed an "oleophilic onium-clay." Such oleophilic clays are obtainable from initially hydrophilic clays as by an ion exchange type of reaction between hydrophilic clays and oleophilic organic "onium" compounds. An "onium" compound can be defined as a group of isologous organic compounds of the type

which are ammonium compounds and isologs thereof and contain the element X in its highest valancy, X being nitrogen, phosphorus, arsenic, antimony, sulfur, selenium and tin and $R_xH_y$, ammonium, phosphonium, arsonium, stibonium, sulfonium, selenonium and stannionium radicals and R is a hydrocarboyl radical.

CLAYS

The clay materials suitable for forming the additive of this invention include natural and synthetic complex silicates of which the swelling clays and especially the montmorillonites are particularly preferred. The exact composition of the complex silicates useful as improving agents in the present compositions is not subject to precise description, since they vary widely from one natural deposit to another. As far as present knowledge permits, they may be described as complex inorganic silicates such as aluminum silicates, magnesium silicates, and barium silicates and the like, containing, in addition to the silicate lattice, varying amounts of cation-exchangeable groups generally regarded as metallic oxide radicals. The table given hereinafter contains naturally-occurring clays, synthetic clays and synthetic zeolites particularly suitable for use in the present compositions. While the Wyoming type of bentonite occurs more generally in deposits throughout the United States, a much more satisfactory clay for the present purpose includes montmorillonite wherein the magnesium content is especially high. Of these, Hectorite exhibits outstanding properties. Hectorite is characterized by the following typical formula:

The use of natural materials may be avoided by the preparation of "synthetic clays" or by the manufacture of synthetic zeolites. Synthetic clays are typically prepared by co-precipitation of silicate and magnesia, drying the co-precipitated gel, mixing the resulting xerogel with an alkali metal hydroxide such as potassium or sodium hydroxide and heating the mixture for a period of one-half to four days at a temperature from 150° to 400° C. under pressures of 200 to 1,000 lbs. per square inch. In a typical preparation of a synthetic Hectorite, three mol proportions of magnesium chloride were added to three mol proportions of aqueous potassium silicate to produce a co-precipitate of magnesium silicate having a silica-magnesia ratio of about 1.6. The resulting gel was dried and subsequently mixed with 2N sodium hydroxide solution, using 1.6 liters of sodium hydroxide solution for 200 grams of the xerogel. The resulting mixture, when heated for thirty-six hours at 240° C. under a pressure of 450–550 lbs. per square inch, produced a complex magnesium silicate having an amorphous type structure as given by X-ray examination. Similar synthetic clay-like materials may be produced by substituting calcium chloride, barium chloride, aluminum chloride and the like for the magnesium chloride employed above. In place of sodium hydroxide, other alkali hydroxides may be used, such as potassium hydroxide, ammonium hydroxide and lithium hydroxide.

Synthetic zeolites are best described as a series of alumino-silicates containing oxides such as sodium and potassium oxides, in which the sodium and potassium are readily replaced by calcium, magnesium or other ions and vice versa. The framework may be represented by $$Na_2O.Al_2O_3.(SiO_2)_{3-13}.(H_2O)_n$$

The cavities in the lattice contain ions such as potassium, sodium, calcium or magnesium, which balance the negative charges in the framework and are readily replaced. The list which follows gives typical natural and synthetic silicates in accordance with the above descriptions:

CATION-EXCHANGEABLE INORGANIC COLLOIDS

A. Natural clays

Bentonites
    Wyoming bentonite
    Montmorillonites
    Hectorite
Beidellite
Saponite
Nontronite
Sepiolite
Biotite
Attapulgite
Vermiculite
Zeolites
    Edingtonite
    Chabazite
    Natrolite
    Mordenites
    Analcite
    Ultramarine

B. Synthetic clays

Magnesia-silica-sodium oxide
Lime-silica-potassium oxide
Baria-silica-lithium oxide

C. Synthetic zeolites

Complex aluminum silicates
    Exchangeable cation:
        Hydrogen
        Sodium
        Potassium
        Barium
        Magnesium
        Ammonium

OLEOPHILIC CATIONIC SURFACE-ACTIVE AGENT

In order to prepare the inorganic silicates for use as viscosity index improvers and pour point depressing agents for oils such as lubricating oils or fuels, the silicate is preferably dispersed in water to form a hydrosol. Upon dispersion, the cation-replaceable sites become available for cation exchange, which is generally effected with cationic surface-active water-repelling (hydrophobic) agents, of which preferred are the quaternary ammonium salts or their hydroxides, salts of high molecular weight amines with inorganic acids, preferably halogen acids, and salts of high molecular weight amines with water-soluble organic acids, the amino or ammonium radicals thereof bearing at least one hydrocarbon radical (preferably alkyl) having 12-30 carbon atoms. Other miscellaneous types of cationic substances may be employed including condensation products of a polymeric nature derived from the condensation of ammonia or low molecular weight primary or secondary amines with acrolein or its analogs or high molecular weight amines, e. g. octadecyl amine, dodecylamine and the like.

The treatment of the silicate hydrosol with the cationic materials such as those listed hereinbefore results in the formation of a gel hereinafter referred to as an onium-gel, e. g. aminogel. Addition of the cationic materials results in replacement of available cations such as hydrogen, sodium and potassium and the like with substituted onium (e. g. ammonium) ions exhibiting hydrophobic properties.

A sufficient ratio of the onium compound to silicate must be employed to provide the resulting aminogel with an oleophilic character in order to permit ready dispersion later in the lubricating oils or other petroleum hydrocarbon fractions such as fuel oils. For the present purpose, it has been found that the clays should bear at least 30% by weight of hydrophobic surface-active radicals and preferably bear between 30 and 75% by weight of said radicals, while optimum results are obtained when using from 40 to 65% of the radicals based upon the weight of the silicates. The mixture should be stirred or otherwise agitated during introduction of the surface-active agent so as to effect uniform distribution and ion replacement throughout the gel.

In the treatment of natural clays, as well as of the synthetic materials, a preferred category of surface-active agent comprises the quaternary ammonium salts broadly described as oleophilic tetra-organo ammonium halides. Preferably at least one, and desirably two, of the organo radicals is an alkyl radical having a chain length of at least twelve carbon atoms, and optimum results are obtained if two of the alkyl radicals have chain lengths between fourteen and eighteen carbon atoms. Representative preferred substances are dimethyl dihexadecylammonium chloride and dimethyl dioctadecylammonium chloride, and mixtures thereof.

While the quaternary ammonium salts described above are preferred, salts of high molecular weight amines, especially primary or secondary amines, may be used. Preferably, these are salts of hydrohalide acids such as hydrochloric acid or water-soluble organic acids such as acetic acid, and the amines contain at least one aliphatic radical having from twelve to twenty-four carbon atoms. Other water-soluble acids may be used to form the salts, such as hydrobromic acid, nitric acid, formic acid, lactic acid, propionic acid and tartaric acid. The cationic materials need not be completely water-soluble for application to the silicate hydrosols. They are, in fact, for the most part, water-dispersible rather than water-soluble. In many cases they are more soluble in hydrocarbons than in water. This is particularly true when two or more of the alkyl radicals have twelve or more carbon atoms or when the amines are polymeric in nature such as in the case of epichlorohydrin-ammonia condensation products or partial amides thereof such as stearic acid amide. Epichlorohydrinammonia condensation products such as those just referred to have average molecular weights between about 100 and 350 and a general structure as follows:

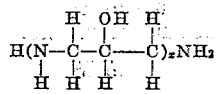

wherein $x$ is an integer sufficient to provide a molecular weight within the recited range. Hydrogen atoms on either the carbon or nitrogen atoms may be replaced with hydrocarbon radicals preferably having from one to six carbon atoms. The following list of cationic surface-active agents gives typical species which may be employed for providing the recited silicates with hydrophobic surfaces:

CATIONIC SURFACE-ACTIVE WATER-REPELLING AGENTS

A. *Quaternary ammonium salts*

Trimethyl dodecylammonium chloride
Trimethyl tetradecylammonium chloride
Triethyl hexadecylammonium chloride
Triethyl octadecylammonium bromide
Dimethyl dihexadecylammonium chloride
Dimethyl cetyl laurylammonium chloride
Dimethyl lauryl stearylammonium chloride
Dimethyl dioleylammonium chloride
Dimethyl diheptadecylammonium acetate
Dimethyl octadecyloctadecenylammonium chloride B. *Ammonium salts of inorganic acids*

Tetradecylammonium chloride
Octadecylammonium bromide
Octadecenylammonium chloride
Methyloctadecylammonium chloride
Ethylhexadecylammonium bromide
Dioctadecylammonium chloride
Octadecylheptadecylammonium bromide
Dihexadecylammonium chloride
Ditetradecylammonium bromide
Octyloctadecylammonium chloride C. *Ammonium salts of organic acids*

Octadecylammonium acetate
Heptadecylammonium propionate
Hexadecylammonium formate
Dioctadecylammonium acetate
Octadecenylammonium tartrate
Heptadecylammonium acetate
12-Hydroxystearylammonium lactate
10-Ketolaurylammonium acetate D. *Miscellaneous compounds*

Acrolein-ammonia condensation products
Diallylamine-H₂S condensation products
Epichlorohydrin-ammonia condensation products
Triphenyl lauryl phosphonium bromide
Trimethyl dodecyl phosphonium chloride
Didodecyl ethyl sulfonium bromide
Decyl triphenyl stibonium bromide
Didodecyl ethyl selenonium bromide
Dodecyl amine
Octadecyl amine
Lauryl amine
Condensation product of epichlorohydrin with ammonia
Reaction product of the condensation product of epichlorohydrin-ammonia with stearic acid (this reaction product is prepared by reacting one mol of epichlorohydrin with ten mols of aqueous ammonia at 35 to 40° C. and treating the resultant product with stearic acid at 180° to 185° C.)

In accordance with the present invention, the modified clays prepared by treatment of the described silicates with cationic surface-active agents such as those listed above may be improved by salt formation with a certain class of acids. The acids found to be particularly effective for this purpose are those in which the acid radical is an oxygen-containing acid radical of an element having an atomic number of 14 to 16, namely, silicon, sulfur and phosphorus.

The preferred species of such acids for use in the preparation of the subject aminogel salts are phosphoric acid and sulfuric acid, although the other analogs and homologs thereof, including the types listed hereinafter, are also effective. The term "acid" in this instance is taken to include partially neutralized acids (such as sodium dihydrogen phosphate or methyl dihydrogen phosphate) as well as the unneutralized acids. These include both organic and inorganic acids and preferably are water-soluble. Alternatively, however, the acids may be oil-soluble, in which case, the modified clays may be treated therewith subsequent to their dispersion in a lubricating oil.

The preferred embodiment comprises treatment of the modified clay while the latter is in aqueous suspension with an amount of the subject acids at least sufficient to form salts with at least 50% of the cationic radicals attached to the silicate. In order to ensure the best results, at least 75% of the cationic radicals should be in salt form, and optimum results are obtained if salt formation is effected with all of the cationic radicals. It has been found a preferable practice in the latter instance to add to the modified clay a substantial excess of the acid in the general range of 150 to 350% of the acid required to form a salt with all of the cationic radicals present in the gel.

The following acids illustrate the group contemplated for use in the preparation of the present compositions. It will be noted that these can be classified as inorganic and organo-inorganic varieties although the inorganic acids are preferred due to their low cost and ready availability.

ACIDS

A. *Inorganic acids*

1. Phosphorus:
   Hydrophosphorous acid
   Phosphorous acid
   Hydrophosphoric acid
   Phosphoric acid
   Hypophosphorous acid
   Hypophosphoric acid
   Orthophosphoric acid
   Pyrophosphoric acid
   Triphosphoric acid
   Tetraphosphoric acid
   Metaphosphoric acid
2. Sulfur:
   Sulfuric acid
   Sulfurous acid
3. Silica:
   Metasilicic acid
   Orthosilicic acid
   Polysilicic acids B. *Organic acids*

1. Phosphorous acids:
   Dilauryl hydrogen phosphate
   Dicetyl hydrogen phosphate
   Distearyl hydrogen phosphate
   Lauryl cetyl hydrogen phosphate
   Stearyl dihydrogen phosphate
   Lauryl dihydrogen phosphate
   Dimethyl hydrogen phosphate
   Dibutyl hydrogen phosphate
   Tetradecane-1-phosphinic acid
   10-phenyldecane-1-phosphonic acid
2. Sulfur acids:
   Octadecane-1-sulfonic acid
   Petroleum sulfonic acid
   Methanesulfonic acid Heptadecane-1-sulfonic acid
p-Toluene sulfonic acid
3. Silicon acids:
Methyl hydrogen silicate
Methanesiliconic acid

OIL BASE

The properties of typical base oils, the viscosity index and pour point of which can be improved by additives of this invention, are:

|  | SAE 10 | SAE 30 |
|---|---|---|
| Sp. Gr | 27.5 | 27.1 |
| Pour Point | −30 | 5 |
| Flash, °F | 340 | 450 |
| Fire, °F | 390 | 500 |
| SUV at 100° F | 146 | 533 |
| Viscosity Index | 52 | 86 |

Various natural as well as synthetic oils, and mixtures thereof, are effectively improved by the incorporation of small amounts of the so-called "oleophilic onium-clays" therein. Thus suitable base petroleum hydrocarbons include fractions having a viscosity of between about 50 and 2,000 SUS at 100° F. and preferably between 100 and 800 SUS at 100° F. Suitable and representative synthetic oils are oils of lubricating viscosity such as oxyalkylene polymers, silicone fluids, organic phosphates, polymerized olefins and esters of dicarboxylic acids. Illustrative and more specific oils are: mineral lubricating oil, preferable viscosity of 300-850 SSU at 100° F., propylene oxide polymers, ethylene oxide-propylene oxide copolymers, trimethylene glycol polymers, ethylene glycol-trimethylene glycol copolymers, dimethyl polymer silicone fluids, tricresyl phosphate, trioctyl phosphate, diphenylcresyl phosphate, diphenyloctyl phosphate, di(2-ethylhexyl) sebacate, dioctyl caprylate, polymerized olefins, di(3-methylheptyl) adipate, polyvinyl caprylate, etc. In addition the viscosity index fuel oils can be improved by addition of modified clays of this invention.

The oleophilic colloid clay material, and mixtures thereof, are used in base oils of this invention in concentrations of from about 0.001% to not more than 0.5% and preferably are used in a concentration of from 0.01 to 0.2% by weight, based on the final composition. Larger amounts than about 0.5% by weight should not be used since amounts in excess of this value result in grease compositions which are entirely unsuited for liquid lubrication purposes of this invention such as engine lubrication, power transmission as in hydraulic systems and torque convertors, metal working, e. g. cutting and drawing, and particularly where high viscosity index liquid lubricants are desired.

A number of processes can be used in the preparation of the modified clays. In the preferred process, the clay or other silicate is dispersed in water to form a hydrosol. Preferably, dispersions of 1 to 5% concentration are easily handled, and the gangue separates readily from dispersions containing 1.5-3.0% of the clay. After separation of gangue, if there is any, the cationic surface-active agent is then added to the agitated hydrosol in order to form a hydrous aminogel. Subsequently, the hydrous gel is water-washed to remove salt or other products formed during the cationic replacement operation. The salt-forming acids are then added to the hydrous aminogel, which is preferably in water suspension. Following salt formation, which occurs substantially instantaneously at room temperature, the salt form of the aminogel is washed, if necessary, to remove excess acid, after which the gel is transferred to the lubricating oil in a concentration of less than 0.5% by weight. Residual water is then eliminated by treatment of the resulting slurry with heat, reduced pressure or both.

In an alternative process, the steps are substantially those outlined above with the exception that salt formation is not effected until after the modified clay has been transferred to the lubricating oil. In this case, an oil-dispersible acid is preferably employed for the salt formation.

A further refinement of the present compositions has been made possible by the discovery that conversion of exchange cations to the hydrogen form in the complex silicate prior to cationic treatment causes an unexpected improvement in the response to the salt-forming acid. After the complex silicate has been dispersed in water to form a hydrosol, the exchange sites may be converted to the hydrogen form by addition of a suitable acid such as hydrochloric acid. Preferably, from about 25 to about 75% of the exchange sites are converted to the hydrogen form, resulting in a hydrosol having a pH less than about 7 and preferably between 5.5 and 6.5. Subsequent to this adjustment, the cationic water-repelling agent is added, after which the described salt formation may take place. It has been found that especially when the pH of the hydrosol is between about 5.5 and 6.5, the maximum response of the aminogel to the salt-forming acid is obtained. The following examples illustrate the improvements obtained by application of the present invention.

Example I

Hectorite clay was dispersed in water to form a 2% hydrosol. A settling period of twelve hours, followed by decanting the clear sol, eliminated the gangue. Sixty per cent by weight, based on the Hectorite, of dimethylheptadecylammonium chloride was added to the sol. Sufficient phosphoric acid was added to the suspension to convert all of the amino radicals thereof to the phosphate salt. The salt form of the modified clay settled rapidly and was readily water-washed, after which it was filtered to remove most of the water. The gel was added to a mineral lubricating oil in an amount of from 0.17% by weight and the composition was heated with stirring to eliminate water.

Example II

The same procedure described in Example I was followed using a Wyoming bentonite instead of Hectorite. This material was oil-soluble and possesses the property of improving the V. I. of base oils.

Example III

A Wyoming bentonite was dispersed in water to form a 3% hydrosol. An aminogel thereof was formed by addition of 60% by weight, based on the bentonite, of dimethyldiheptadecylammonium chloride. After water-washing the hydrogel so formed, sulfuric acid was added in an amount stoichiometrically equivalent to the amino content of the aminogel. This material was added to a mineral oil in an amount of about 0.1% to produce an excellent lubricating oil having an enhanced viscosity index and a lowered pour point.

Example IV

The process described in Example III was repeated using sodium silicate as a salt-forming agent. Addition of about 0.1% of this modified material to a refined mineral oil resulted in a product having an effectively higher viscosity index.

Example V

Three modified Hectorites were prepared using as the salt-forming agents dilauryl acid phosphate, petroleum sulfonic acids and a condensation product of acrolein and ammonia. Each of these modified clays when added to a refined mineral oil improved the oil by forming a product having an effectively higher viscosity index.

Other examples of modified clays of this invention include: trimethyl dodecyl ammonium-Hectorite; dimethyl didodecyl ammonium-Hectorite; trimethyl octadecyl ammonium-Hectorite; trimethyl octadecyl ammonium-Hectorite; trimethyl hexadecyl ammonium-Hectorite; trimethyl dodecyl ammonium-Hectorite; trimethyl dodecyl phosphonium-Hectorite; triphenyl lauryl phosphonium-Hectorite; didodecyl ethyl sulfonium-Hectorite; "Arquad 2HT" modified Hectorite [1]; dimethyl dihexadecyl ammonium-Hectorite, and dimethyl laurylcetyl ammonium-Hectorite.

To illustrate the pronounced improvement in viscosity index which can be obtained with various base oils by addition thereto of modified clays of this invention the following data are presented:

Examples of detergent-forming acids are the fatty acids of say, 10 to 30 carbon atoms, tall-oil acids, rosin acids, wool-fat acids, paraffin-wax acids (produced by oxidation of paraffin wax), chlorinated fatty acids, aromatic hydroxy fatty acids, paraffin-wax benzoic acids, various alkyl salicyclic acids, phthalic acid monoesters, aromatic keto acids, aromatic ether acids, diphenols such as di-(alkylphenol) sulfides and disulfides, methylene bis-alkyl phenols; sulfonic acids such as may be produced by treatment of alkyl aryl hydrocarbons or high-boiling petroleum oils with sulfuric acids; sulfuric acid monoesters; phosphoric, arsonic and antimony acid mono- and di-esters, including the corresponding thiophosphoric and arsonic acids and the like.

Additional detergents are the alkaline earth metal phosphate di-esters, including the thiophosphate di-esters; the alkaline earth metal diphenolates, specifically, the calcium and barium salts of diphenol mono- and poly-sulfides.

Non-metallic detergents include compounds such as the phosphatides (lecithin and cephalin), certain fatty oils such as rapeseed oils, "Voltolized" fatty or mineral oils and the like.

An excellent detergent for the present purpose is the calcium salt of oil-soluble petroleum sulfonic acids. This may be present advantageously in the amount of about 0.025% to 0.2% sulfate ash. Also, alkaline earth metal salts of alkyl phenolaldehyde condensation products are excellent detergents.

Antioxidants which are suitable for use in combination with the composition of this invention comprise several types, for example, alkyl

| Base Oil | Amt. of Add. percent wt. | Additive | Visc. Centistokes | | V. I. | Remarks |
|---|---|---|---|---|---|---|
| | | | at 100° F. | at 210° F. | | |
| Mineral Oil—SAE 10 | | | 51.2 | 5.99 | 52 | |
| Do | 0.1 | Hectorite | 156 | 12.6 | 72 | Unstable Suspension. |
| Do | 0.1 | Modified Hectorite of Ex. I | 72 | 10.1 | 125 | Stable Suspension. |
| Transformer Oil | 0.1 | Hectorite | 156 | 12.6 | 72 | Unstable Suspension. |
| Do | | | 15.9 | 3.1 | 30 | |
| Do | 0.1 | Modified Hectorite of Ex. I. | 27.0 | 5.0 | 125 | Stable Suspension. |
| Mineral Seal Oil | | | 9.6 | 2.41 | 70 | |
| Do | 0.1 | Hectorite | 156 | 12.6 | 72 | Unstable Suspension. |
| Do | 0.1 | Modified Hectorite of Ex. I. | 22.1 | 4.4 | 190 | Stable Suspension. |
| Do | 0.1 | Arquad 2HT Mod. Hector. | 21.3 | 5.40 | 180 | Do. |
| Do | 0.1 | Arquad 2HT+H₃PO₄— Mod. Hectorite. | 25.3 | 5.7 | 164 | Do. |
| Mineral Oil—SAE 30 | | | 131.6 | 10.4 | 56 | |
| Do | 0.3 | Hectorite | 156 | 12.6 | 72 | Unstable Suspension. |
| Do | 0.3 | Arquad 2HT Mod. Hectorite. | 278 | 28.2 | 123 | Stable Suspension. |
| Do | 0.3 | Dimethyl laurylcetyl-amm. (NH₄)—Hectorite. | 1,000 | 75 | 125 | Do. |

Compositions of this invention can have incorporated therewith other additives such as blooming agents, anti-wear agents, anti-oxidents, anti-foaming agents, and the like. Among the specific additives for lubricating purposes which can be used are oil-soluble detergents which include oil-soluble salts of various bases with detergent-forming acids. Such bases include metal-containing as well as organic bases. Metallic bases include those of alkali metals, Ca, Mg, Cu, Sr. Ba, Zn, Cd, Al, Sn, Pb, Cr, Mn, Fe, Ni, Co, etc. Organic bases include various nitrogen bases as primary, secondary and tertiary amines and quaternary ammonium hydroxides, e. g., benzyl trimethyl ammonium hydroxide.

[1] Arquad 2HT is a mixture of dimethyl dihexadecyl and dimethyldioctadecyl ammonium chloride manufactured by Armour and Company.

phenols such as 2,4,6-trimethylphenol, pentamethylphenol, 2,4-dimethyl 6-tertiary-butylphenol, 2,4-dimethyl-6-octylphenol, 2,6-ditertiary-butyl-4-methylphenol, 2,4,6-tritertiary-butylphenol, and the like; aminophenols such as benzylaminophenols; aromatic amines, such as N,N'-dibutyl - p - phenylenediamine, diphenylamine, phenyl-beta-naphylamine, phenyl-alpha-naphthylamine and dinaphthylamine.

Corrosion inhibitors or anti-rusting compounds may also be present, such as dicarboxylic acids of 16 or more carbon atoms, alkali metal and alkaline earth metal salts of sulfonic acids and fatty acids, organic compounds containing an acidic radical in close proximity to a nitrile, nitro, or nitroso group (e. g., alpha-cyanostearic acid), glycidyl phenyl ether, wax disulfide, etc.

Additional ingredients may comprise oil-soluble urea or thiourea derivatives, e. g., urethanes, allophanates, carbazides, carbazones, etc., polyisobutylene polymers, unsaturated polymerized esters of fatty acids and monohydric alcohols and other high-molecular-weight oil-soluble compounds.

Depending upon the additional additive used and conditions under which it is used, the amount of additive used may vary from 0.01 to 2% higher. However, substantial improvement is obtained by using amounts ranging from 0.1 to 0.5% in combination with reaction products of this invention.

I claim as my invention:

1. A lubricating oil base having incorporated therein from 0.01 to 0.5% by weight, which amount is insufficient to modify the viscosity of the lubricating oil base, of clay modified by an organic cationic material selected from amines and quaternary ammonium compounds so as to render said clay oleophilic.

2. A liquid hydrocarbon lubricating base having incorporated therein from 0.01 to 0.5% by weight, which amount is insufficient to modify the viscosity of the base lubricant, of a clay modified by a quaternary ammonium compound, said clay thereby being rendered oleophilic.

3. A liquid mineral lubricating oil base having incorporated therein from 0.01 to 0.5% by weight, which amount is insufficient to modify the viscosity of the base lubricant, of a clay modified by a quaternary ammonium compound, said clay thereby being rendered oleophilic.

4. A liquid mineral lubricating oil base having incorporated therein from 0.01 to 0.3% by weight, which amount is insufficient to modify the viscosity of the base lubricant, of an oleophilic onium-bentonite.

5. A liquid mineral lubricating oil base having incorporated therein from 0.01 to 0.3% by weight of an oleophilic onium-Hectorite.

6. A liquid mineral lubricating oil base having incorporated therein from 0.01 to 0.3% by weight of an oleophilic alkyl ammonium-bentonite.

7. A liquid mineral lubricating oil base having incorporated therein from 0.01 to 0.3% by weight, which amount is insufficient to modify the viscosity of the base lubricant, of an oleophilic alkyl ammonium-Hectorite.

8. A liquid mineral lubricating oil base having incorporated therein from 0.01 to 0.03% by weight, which amount is insufficient to modify the viscosity of the base lubricant, of dimethyl cetyl lauryl ammonium-bentonite.

9. A liquid mineral lubricating oil base having incorporated therein from 0.01 to 0.3% by weight, which amount is insufficient to modify the viscosity of the base lubricant, stearic acid amide of the condensation product of epichlorohydrin-ammonium-bentonite.

10. A liquid mineral lubricating oil base having incorporated therein from 0.01 to 0.3% by weight, which amount is insufficient to modify the viscosity of the base lubricant, dimethyl cetyl lauryl ammonium-Hectorite.

11. A liquid mineral lubricating oil base having incorporated therein from 0.01 to 0.3% by weight, which amount is insufficient to modify the viscosity of the base lubricant, stearic acid amide of the condensation product of epichlorohydrin-ammonium-Hectorite.

12. The composition of claim 10 wherein the modified Hectorite is in the salt form with phosphoric acid.

13. The composition of claim 10 wherein the modified Hectorite is in the salt form with sulfuric acid.

14. The composition of claim 1 wherein the oleophilic clay is in the salt form with an inorganic acid.

15. The composition of claim 1 wherein the oleophilic clay is in the salt form with an organic acid.

16. A composition of claim 1 wherein the oleophilic clay is in the salt form with acids selected from the group consisting of non-metal containing inorganic and organic compounds the acidic portion of which contains elements selected from the group consisting of phosphorus and sulfur.

17. The composition of claim 9 wherein the bentonite compound is in the salt form with phosphoric acid.

18. The composition of claim 9 wherein the bentonite compound is in the salt form with sulfuric acid.

19. The composition of claim 9 wherein the bentonite compound is in the salt form with dilauryl hydrogen phosphate.

GEZA S. RONAY.

References Cited in the file of this patent

UNITED STATES PATENTS

| Number | Name | Date |
|---|---|---|
| 2,033,856 | Smith | Mar. 10, 1936 |
| 2,260,625 | Kistler | Oct. 28, 1941 |
| 2,531,440 | Jordan | Nov. 28, 1950 |
| 2,554,222 | Stross | May 22, 1951 |